US007254526B2

(12) United States Patent
Aupperle et al.

(10) Patent No.: US 7,254,526 B2
(45) Date of Patent: Aug. 7, 2007

(54) APPARATUS AND METHOD FOR DETERMINING COMPATIBILITY OF WEB SITES WITH DESIGNATED REQUIREMENTS BASED ON FUNCTIONAL CHARACTERISTICS OF THE WEB SITES

(75) Inventors: Bryan E. Aupperle, Apex, NC (US); Marcia L. Peters, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1078 days.

(21) Appl. No.: 09/938,966

(22) Filed: Aug. 24, 2001

(65) Prior Publication Data

US 2003/0051027 A1     Mar. 13, 2003

(51) Int. Cl.
G06F 9/455 (2006.01)
G06F 15/16 (2006.01)
G06F 15/173 (2006.01)
G06F 15/00 (2006.01)

(52) U.S. Cl. .................. 703/27; 709/217; 709/219; 709/223; 709/224; 715/530

(58) Field of Classification Search ............ 703/27, 703/22; 709/223, 217–219; 715/530 T
See application file for complete search history.

(56) References Cited

U.S. PATENT DOCUMENTS

| 5,870,559 | A | * | 2/1999 | Leshem et al. ............ 709/224 |
| 5,958,008 | A | * | 9/1999 | Pogrebisky et al. ........ 709/223 |
| 6,044,387 | A | * | 3/2000 | Angiulo et al. ............ 715/533 |
| 6,151,599 | A | * | 11/2000 | Shrader et al. ............... 707/9 |
| 6,185,701 | B1 | * | 2/2001 | Marullo et al. ............ 714/38 |
| 6,341,310 | B1 | * | 1/2002 | Leshem et al. ............ 709/223 |
| 6,549,944 | B1 | * | 4/2003 | Weinberg et al. .......... 709/224 |
| 6,594,692 | B1 | * | 7/2003 | Reisman .................... 709/219 |
| 6,631,408 | B1 | * | 10/2003 | Welter et al. ............. 709/223 |
| 6,684,257 | B1 | * | 1/2004 | Camut et al. ............. 709/246 |
| 6,741,967 | B1 | * | 5/2004 | Wu et al. ................... 705/10 |
| 6,745,238 | B1 | * | 6/2004 | Giljum et al. ............. 709/219 |
| 6,874,099 | B1 | * | 3/2005 | Balasubramanian et al. ... 714/4 |
| 6,895,551 | B1 | * | 5/2005 | Huang et al. ............. 715/513 |
| 6,920,494 | B2 | * | 7/2005 | Heitman et al. ........... 709/223 |
| 6,920,495 | B1 | * | 7/2005 | Fuselier et al. ........... 709/224 |
| 6,928,471 | B2 | * | 8/2005 | Pabari et al. ............. 709/223 |
| 7,000,102 | B2 | * | 2/2006 | Kumar et al. ................ 713/2 |

OTHER PUBLICATIONS

AccVerify Professional User Guide Apr. 2001. p. 1-162.*

(Continued)

*Primary Examiner*—Anthony Knight
*Assistant Examiner*—Tom Stevens
(74) *Attorney, Agent, or Firm*—Stevens & Showalter

(57) ABSTRACT

An apparatus and method for searching a database of web site functional characteristics to identify web sites that are compatible with designated functions are provided. With the apparatus and method, a database of functional characteristics is compiled and a search interface is provided. The database may be compiled in an automatic, manual, or semiautomatic manner by, for example, retrieving web site content with various functions of a web browser disabled and analyzing the resultant output through the web browser. With the search interface, a user may enter designations of the functional characteristics that the user is either interested in having or not having in the resultant list of web sites. Based on the user's designation of functional characteristics, the search engine associated with the search interface searches the database of web sites and identifies the web site entries in the database that are compatible with the designated functional characteristics. The search engine then provides a listing of these web site entries through a search output interface which may then be used by the user that requested the search.

42 Claims, 6 Drawing Sheets

OTHER PUBLICATIONS

IBM Host Interogation: A Practical Approach to Performance Planning. p. 1-97. Dec. 2000.*

Page et al., "Panel: Strategic Directions in Simulation Research" 1999 Winter Simulation Conference p. 1509-1520.*

Raghavan et al., "Load-Testing of Web Site Applications: Analysis and Recommendations". May 2001 p. 1071-1072.*

Brutzman et al., "Internetwork Infrastructure Requirements for Virtual Environments" 1995. p. 95-104.*

* cited by examiner

APPARATUS AND METHOD FOR DETERMINING COMPATIBILITY OF WEB SITES WITH DESIGNATED REQUIREMENTS BASED ON FUNCTIONAL CHARACTERISTICS OF THE WEB SITES

BACKGROUND OF THE INVENTION

1. Technical Field

The present invention is directed to an apparatus and method for determining compatibility of web sites with designated requirements. More specifically, the present invention is directed to an apparatus and method for creating and searching a database of web sites, identifying the functional characteristics of the web sites and typically enabled functions of client computers that make use of the web sites, and using this database to determine compatibility of the web sites with designated requirements.

2. Description of Related Art

With the rapid expansion of the Internet as a source of information and a medium for conducting business and other transactions, it has become more difficult to identify web sites and their functionality. In an attempt to alleviate the problem of identifying web sites, search engines have been developed that allow users to enter search terms which are used by the search engine to identify web sites in their database that make use of those terms as keywords. If the user structures his/her search terms appropriately, the user may be provided with a list of web sites that are of interest to the user, although such a list typically includes a large number of web sites that are not of interest to the user as well.

Search engines may be used to identify web sites that address certain subject matter. For example, if a user wishes to obtain information about leukemia, the user may enter the search term "leukemia" in a field of the search engine and be provided with a list of web sites that make use of this term and thus, are more likely than not to deal with this subject matter.

Search engines may also be used to identify web hosting providers with desired platform capabilities. For example, if a user wishes to obtain information about hosting providers whose platforms have a Linux version 4.2 operating system, a CGI interpreter, SQL database software installed, and redundant T3 links to the Internet backbone, one may enter these search terms in a particular search engine that specializes in this type of information, and get a list of hosting providers meeting the search criteria, their contact information, and prices.

Web sites deliver their content to web browsers using a variety of techniques, running the gamut from the basic HTML 1.0 standard (RFC 1945), to optional plug-ins requiring that browser add-on code be installed on the client in order to view the enhanced content, to active scripting techniques such as those described hereafter. The designer of web site content may always safely assume that every web browser supports the basic HTML standard. However, the user of a web browser may choose not to install a specific plug-in or may choose to disable active scripting or other optional browser features. Thus some users choose to forego an enhanced browsing experience for various reasons, including concerns about security exposures. Those users who choose to forego the enhanced browsing experience may miss information and content that would otherwise be made available to them.

While search engines may be used to identify web sites that address certain subject matter or have certain platform capabilities, search engines do not have any ability to perform searches of web sites based on the functional characteristics of the web sites, e.g., the types of browser plugin modules utilized by the web pages comprising a web site, whether and what type of active scripting is used within the web pages of a web site, and the like.

"Active scripting," as the term is used herein, refers to techniques such as JavaScript, Java, and ActiveX that download interpreted programming language statements or compiled bytecodes to a client workstation during the loading by a web browser of a specified web page. Such statements or bytecodes may be executed at the client workstation by an execution environment such as a JavaScript interpreter, a Java Virtual Machine, or a Microsoft Windows DLL ("dynamic link library"), respectively. The functions provided by active scripting technologies are typically used by web site designers to add interactivity and dynamic behavior to an otherwise-static web page.

In addition, to meet the varying security and privacy needs of users, browsers such as Microsoft's Internet Explorer allow an individual user to define specified "security zones" having different functional characteristics, such as disabling plug-ins, or disabling a particular active scripting technique. A user may associate a list of designated domain names with a given security zone. Thus when the user visits one of the designated domain names, the browser applies the user-defined properties of that "security zone." Ergo, the browser may disallow active scripting, plug-ins, cookies, forms, and so forth, with respect to specific web sites, on a site-by-site basis. As a result, any web content that is delivered exclusively using one of the techniques not supported or disabled by the browser would not be seen by the user of that browser.

For example, while active scripting offers many possibilities to the programmer and can make the user's web browsing experience more interesting, active scripting has sometimes been exploited by hackers as a way to deliver malicious software to a client workstation such as a Trojan virus program that allows a hacker to control the workstation remotely without the computer owner's knowledge and consent, invade the user's privacy by spying on personal information, or steal confidential data from the computer. Therefore some users choose to disable active scripting when accessing untrusted web sites, to reduce their exposure to security exploits of this kind.

Thus, it would be beneficial to have an apparatus and method for compiling information about the functional characteristics of web sites. It would further be beneficial to have an apparatus and method for determining the most probable client device enabled functions corresponding to the functional characteristics of the web sites in order to determine how information may be relayed to a user of the client device. It would also be beneficial to have an apparatus and method for determining the compatibility of web sites with designated requirements based on the functional characteristics of the web sites and the enabled functions of the client devices of the web sites' typical users.

SUMMARY OF THE INVENTION

The present invention provides an apparatus and method for creating and searching a database of web site functional characteristics to identify web sites that are compatible with designated functions. With the present invention, a database of functional characteristics is compiled and a search interface is provided.

By "functional characteristics" what is meant is the functions supported by the web site that require functions to be enabled by user client devices in order to output the content of the web site on the client device and/or receive input from the client devices directed to the web site. These functions may be provided through the computer code of the web site, plugin modules used by the web site, third party web sites, applications resident on client devices, and the like.

The database of functional characteristics may be compiled in automatically, manually, or a combination of automatically and manually. In one preferred embodiment, the database of functional characteristics is compiled by generating a list of web sites and a list of functions that are to be tested. For each web site in the list of web sites, each function in the list of functions is tested. By testing, what is meant is that the function in the client web browser is disabled and the web site content retrieved. An analysis is then made as to whether the expected content is received and output through the client web browser with the function disabled. The results of the testing are then stored in a database entry.

The database of functional characteristics compiled by the present invention may be searched by a search engine to identify web sites having, or not having, functional characteristics of interest. Through a search interface, a user may enter designations of the functional characteristics that the user is either interested in having or not interested in having in the resultant list of web sites.

Based on the user's designation of functional characteristics, the search engine associated with the search interface searches the database of web sites and identifies the web site entries in the database that are compatible with the designated functional characteristics. The search engine then provides a listing of these web site entries through a search output interface which may then be used by the user who requested the search. Other features and advantages of the present invention will be described in, or will become apparent to those of ordinary skill in the art in view of the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
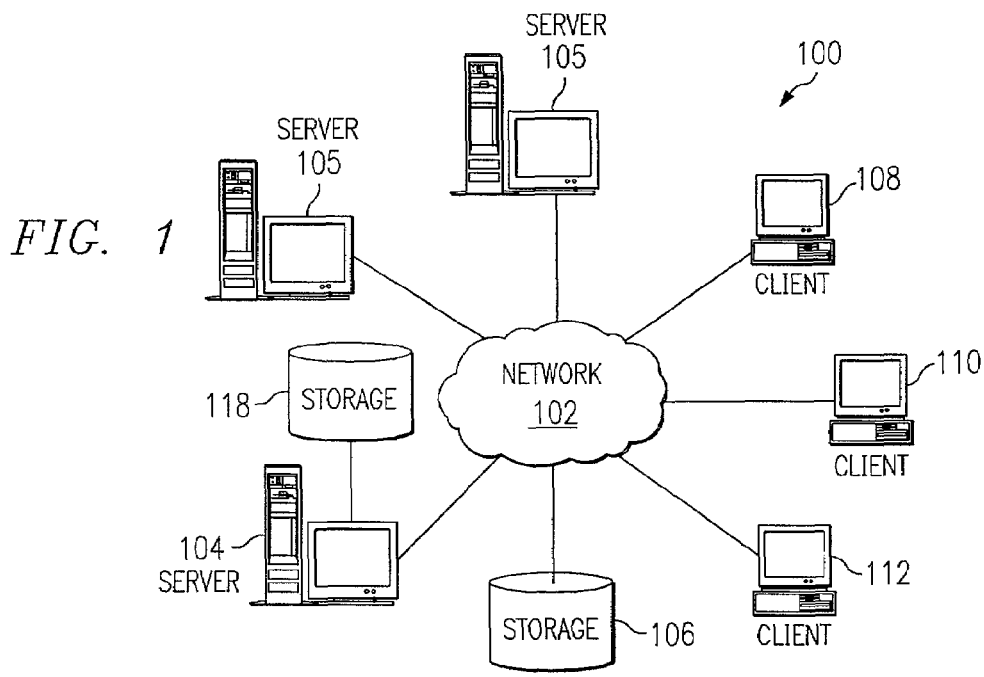
FIG. 1 is an exemplary diagram illustrating a distributed data processing system in accordance with the present invention.

The present invention provides an apparatus and method for compiling functional characteristic information about web sites. In addition, the present invention provides an apparatus and method for identifying web sites that have functional characteristics, and whose typical users' browsers have functional characteristics, that meet designated requirements.

The term "functional characteristics," as used in this description, refers to one or more of the functions that may be performed via the web site or are supported by the web site, and the functions that are supported by the browsers of typical users of the web site, as opposed to platform characteristics. These functions may include, for example, the ability to provide dynamic web page content, provide dynamic user interfaces, display digital movies, broadcast audio data, fill in forms, store cookies on the user's hard drive, and the like, as well as provide specific types of each of these functions.

The functional characteristics may be provided by web application software on the server(s) hosting the web site itself, middleware or platform software on the server(s) hosting the web site, third party web sites, plugin modules to the server(s) hosting the web site, data sent from the server(s) hosting the web site to one or more of a browser function, runtime environment, interpreter, compiler, browser plugin module, platform function, dynamic link library (DLL), operating system, application program, etc. resident on a client computer, and the like.

For the purposes of this invention, there are two relevant aspects to the web site's support of any given functional characteristic. First, the functional characteristic may require that certain software be installed and resident and enabled on the web server(s) hosting the web site. For example in order for a web site to deliver streaming video using the Real Video technology, it must have a Real Video streaming server component installed.

Second, making use of the functional characteristic to deliver web content to an end user may require that web browser clients visiting the web site also have particular software installed and enabled on the client workstation. Again using Real Video as an example, clients visiting the exemplary web site would have to have the Real Video player installed and enabled, in order to view streaming video from a Real Video streaming server.

Simply determining that a given web site offers a particular functional characteristic is not sufficient. To a web content creator, it is also important to know whether typical clients visiting that web site are likely to have a particular client-side component installed and enabled.

Today there is no standard way to determine, from a program resident on a web server, all the relevant functional characteristics of clients typically visiting that web site. Certain specific functional characteristics can be determined by program logic, but others can only be determined by human inspection of web content delivered to a client workstation.

For example, if the client device has JavaScript enabled, it is often possible, using JavaScript, for the web content creator to query the client's browser and determine its functional characteristics. However, JavaScript itself is one of the functional characteristics that may be disabled in the client's browser. The distinction between determining programmatically and determining by human inspection of delivered content is illustrated in the following two examples.

For example, if the HTML file contains a SCRIPT tag such as the following:

<SCRIPT language="javaScript" SRC="ads.js"></script>then one may infer that the web page in question uses JavaScript to deliver its content. This tag causes the client's browser to make a separate HTTP request to the web server for an executable JavaScript file named "ads.js". Subsequent statements in the web page may invoke functions defined in the downloaded JavaScript file, which are then executed locally on the client. However, this tag does not indicate whether the browser on the client device actually has JavaScript enabled.

If the web page designer has inserted a NOSCRIPT tag for display if the browser does not have JavaScript enabled, such as the following:

<NOSCRIPT>

Your browser has JavaScript disabled.

You need a JavaScript-enabled browser to enjoy the features of this website.

</NOSCRIPT> then one may infer that the web page designer intends for the functional content of the web site to be delivered only to users who have JavaScript enabled, and thus that users with JavaScript disabled will not be able to view the web site's expected functional content. Moreover, these users are also unlikely to bookmark or return to the web site at a later time. In addition, from this tag a web content designer could further infer that JavaScript may be used freely for adding additional content, for example advertising, to that particular web site.

As a further example, a web site may offer interactive maps to a user. The user may visit that particular web site expecting to obtain a map, to zoom and scroll the map in order to display a particular geographic coordinates, and to print a set of driving directions. If the zoom, scroll and print functionality is provided using JavaScript, but the client has JavaScript disabled, then the user is unlikely to visit that particular web site more than once, because the web site's functional content is not available without a JavaScript-enabled client.

Similarly, a book seller's web site may offer searching as the only way one may locate a particular book that the user wants to buy. In order to access the search function provided, the web site presents a form, and the user enters the book name on the search form. However, forms support is another browser functional characteristic that may be selectively disabled by the user, perhaps because a concern for the potential security exposure of accidentally sending private information to an untrusted web site. Therefore, if the only way to find a desired book on the web site is to submit a form, but the user has forms disabled, then that user would be unlikely to visit the web site again since there is no way for the user to buy a particular book without exercising the disabled search function. A web content provider wishing to add content to that particular web site could therefore include forms as part of their content, and be confident that users of that site would not be bared from interacting with the forms because of their choice of browser settings.

A <NOSCRIPT> tag such as the example above cannot be interpreted programmatically with present technology, since no standard dictates the format or content of the comment within the tag. The comment is simply arbitrary human-readable text. Thus its interpretation generally requires inspection by a human. By extension, however, one may envision how a sophisticated artificial-intelligence type heuristic algorithm may be programmed to perform similar probabilistic judgment functions as the human and thereby be able to interpret the comment within the tag.

Another example of functional characteristics of a web browser is provided below. This is JavaScript code that may be embedded in a HTML page, that interacts with JavaScript on a Netscape browser, to query the browser as to whether the ShockWave plug-in is installed. If this code is present in an HTML page, it may be assumed that the creator of the HTML page intended that it be used with the ShockWave plug-in. Thus, by identifying this code in the HTML page, one may determine that the HTML page supports the functional characteristic of using the SHOCKWave plug-in application.

```
<!--
var plugin = (navigator.mimeTypes &&
        navigator.mimeTypes["application/x-shockwave-flash"]) ?
        navigator.mimeTypes["application/x-shockwave-
        flash"].enabledPlugin : 0;
    if ( plugin &&
    parseInt(plugin.description.substring(plugin.description.
    indexOf(".")-1)) >= 4 ) {
        // Check for Flash version 4 or greater in Netscape
        document.write('<EMBED src="t1.swf" quality=best
        bgcolor=#6633CC ');
        document.write (' swLiveConnect=FALSE WIDTH=100%
        HEIGHT=100%');
        document.write (' TYPE="application/x-shockwave-flash"
        PLUGINSPAGE="XXXXXXXXX">');
} else if (!(navigator.appName &&
    navigator.appName.indexOf("Netscape")>=0 &&
    navigator.appVersion.indexOf("2.")>=0)) {
    // Netscape 2 will display the IMG tag below so don't
    write an extra one
    document.write('<IMG SRC="noflash.gif" WIDTH=550
    HEIGHT=400 BORDER=0>');
}
//-->
```

These various characteristics of the web site identify the various types of functions that may be performed using the web site, and by inference, the browser functional characteristics that are likely to be supported, or not supported, by typical users visiting that web site. Thus, for the example given above, the web site may provide digital movies, may provide dynamic user interfaces for communicating with a user, and may provide music in the form of MP3 files. The present invention provides a mechanism for determining what these functional characteristics are for a plurality of web sites and allows a user to search a database of these web sites to identify the ones in which the user is interested based on their functional characteristics.

The present invention may be implemented as a service provided to customers requesting identification of web sites that have functional characteristics of interest. In one embodiment, a customer may request identification of web sites having and/or not having certain functional characteristics. This request may then result in a search of a database of web sites and their characteristics. Such a database may be created through use of a computing device, manually, or through a combination of manually and using a computing device. The results of the search may then be provided to the customer in exchange for a fee.

In a first preferred embodiment, the compilation of the database is done automatically by a computing device, by successively querying a series of web pages, parsing the web pages, determining the functional characteristics of the web pages, and logging the results in a database for subsequent querying. In a second preferred embodiment, the compilation of the database is done manually by a human being, by successively disabling a specific functional characteristic of a web browser, accessing one or more web pages, examining the returned web pages, determining if the expected content was delivered despite the specific functional characteristic being disabled, and recording the results in a database. In a third preferred embodiment, the compilation of the database is done by first utilizing automatic methods of the first embodiment, then subsequently utilizing manual methods of the second embodiment to refine the logged results.

The steps of disabling and accessing may be automated, with an intervening examining stage by a human being between each successive performance of the disabling and accessing steps. Furthermore the successive accessing of a list of web pages can be done manually or automated.

It will be appreciated that there is considerable latitude in the order in which these steps may be performed and still produce the same results; all such equivalent variations are within the spirit and scope of the invention. For example a specific functional characteristic could be disabled and a series of different web sites accessed and the results logged; or a given web site could be tested while successively disabling and enabling a list of functional characteristics to be tested and the results logged.

The submission of a request for the service and eventual return of search results may be facilitated in many different ways including through human interaction, traditional mail systems, through automated telephone based systems, through a computer network, and the like. The preferred embodiment of the present invention makes use of computing devices to both receive the request and process the request to thereby perform a search and provide the results to the customer. Although the preferred embodiment makes use of computing devices to both receive and process the search request, it should be appreciated that the present invention may be implemented as a human based method in which a computing device is only used to perform the actual search of the database.

In the preferred embodiment, the submission of the request, performance of the search and providing of the search results are performed in an automated manner. In this preferred embodiment, a user of a client device submits a request for a search of web sites having and/or not having particular functional characteristics using a search request interface of the present invention. The search request is then submitted to a service engine of the present invention which performs a search of web site entries in a web site database. The service engine then provides the results of the search to the requesting user. In addition, a payment and billing engine may be provided for requesting, obtaining, and verifying account information for payment of a fee for the service provided and eventual charging of the fee to the account submitted by the user.

Because the preferred embodiment of the present invention makes use of a distributed client/server computing system, the following is a brief explanation of the components of a distributed client/server computing system that may serve as an environment in which the present invention may be implemented. Although the preferred embodiment of the present invention will be described with reference to FIGS. 1-3, these figures are not intended to imply any limitations in the implementation of the present invention and many modifications may be made without departing from the spirit and scope of the present invention.

With reference now to the figures, FIG. 1 depicts an exemplary network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, servers 104 and 105 are connected to network 102 along with storage unit 106. The servers 104 and 105 are described in greater detail hereafter.

In addition, clients 108, 110, and 112 are connected to network 102. These clients 108, 110, and 112 may be, for example, personal computers, notebook computers, personal digital assistants (PDAs), cellular telephones, wireless two-way pagers, network computers, or any other computing device capable of communication via the network 102.

In the depicted example, server 104 provides data, such as web pages and results of database queries, to clients 108-112. Servers 105 are web servers hosting various web sites.

Servers 105 provide web pages and other data to clients 108-112. Clients 108, 110, and 112 may be clients to servers 104-105. Server 104 also may provide data about servers 105 to clients 108-112. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

The server 104 may be used as a mechanism for providing the services offered by the present invention. As such, the server 104 may be equipped with software and hardware for implementing the functions of the present invention. For example, the server 104 may be provided with a software application for providing a search interface through which a user may enter a search request, an application for performing the search of a database of web site functional characteristics, and an application for providing search results to the user. In addition, the server 104 may be provided with communication hardware for communicating with client devices via the network 102 and for retrieving information from a web site database stored on storage device 118.

If a user wishes to identify web sites based on their functional characteristics and/or the functional characteristics of the browsers of typical clients visiting the web site, there currently is no mechanism for doing so. The present invention provides such a mechanism.

For example, advertisers may wish to identify web sites that have functional characteristics that will make the implementation of their advertisements on them easy and straightforward with minimal or no alteration of the advertisements required, or web sites whose functional characteristics will permit the use of streaming media to deliver more interesting advertising content. The present invention allows such advertisers to input functional characteristics that would make the implementation of the advertisements easy and straightforward, or to select web sites that will permit the use of desired functional characteristics in the advertising. The present invention then searches a web site database and returns a list of web sites that meet the functional characteristic requirements. Likewise, advertisers may wish to determine what functional characteristics are present in most web sites of interest. With the present invention, database entries may be searched to determine which functional characteristics are most prevalent in the web sites, so they may tailor their advertising web content accordingly.

Moreover, a user may wish to avoid certain web sites that have particular functional characteristics. For example, if a user does not have a particular plugin module on his/her client device and does not wish to make use of the plugin module, the user may wish to avoid web sites that use this plugin module. The present invention may then be used to identify web sites that lack this functional characteristic. There are a number of reasons why a user may wish to identify web sites based on their functional characteristics with the above being only some simple examples.

With the present invention, a user of a client device, such as client device 112, logs onto the service provider of the present invention provided on server 104. The logging onto the service provider may be performed by entering a Uniform Resource Locator (URL) of the web site on the server 104 using a web browser application resident on the client device, for example.

Once the client device 112 is in communication with the server 104, the user may browse the contents of the web site thereon. Within these contents is the ability to make use of a web site functional characteristics search engine of the present invention. In order to make use of this search engine, the user is provided with a search engine interface through which the user may enter functional characteristics that the user wishes to be supported by web sites returned in the search results, and optionally, functional characteristics of web sites that the user does not wish to be supported by web sites returned in the search results.

The functional characteristics identified by the user may be grouped together (i.e., specified) using well-known Boolean operations such as "AND", "OR", "NOT" and the like. By using the "AND" grouping, web sites that are returned in search results must have both functional characteristics identified. By using the "OR" grouping, web sites that are returned in search results may have either functional characteristic identified. The "NOT" grouping may be used to designate a functional characteristic that the web site should not have. Of course these groupings may be arranged in any number of different ways to effect more complicated searching of the web site database of the present invention. Other functions of search engines as they are generally known in the art may be included in the search engine of the present invention without departing from the spirit and scope of the present invention.

After receiving the user's input specifying functional characteristics of interest, the search request is provided to a search engine of the present invention. The search engine of the present invention parses the search request and searches an associated database of web sites and their corresponding functional characteristics. The search engine determines which of these database entries meets the functional characteristics criteria designated by the user's search request. The resultant list of web sites may then be returned to the user by way of an output interface transmitted to the user's client device.

As previously mentioned, the present invention may be offered as a service to customers wishing to identify web sites that have particular functional characteristics. As such, users of the present invention may be charged a fee for use. As a service, the present invention may further include a billing system through which account information may be solicited from a user, verified and stored for use in later billing. Alternatively, web site owners may be charged a fee for having their web sites included in the web site database of the present invention.

In addition to the above, it should be noted that another embodiment of the present invention may include a combination of conventional text based search engines and the functional characteristic search engine of the present invention. For example, a conventional search engine or metasearch engine, such as Yahoo™, HotBot™, Lycos™, Webcrawler™, and the like, may be used to identify web sites offering a particular subject matter. Thereafter, the functional characteristic search engine of the present invention may be used to search the search results identified by the conventional search engine to determine which subset of these has functional characteristics of interest to the user.

In such an embodiment, the search results returned by the conventional search engine may be used to retrieve database entries for these web sites from the web site database. The retrieved entries may then be searched using the functional characteristics search engine of the present invention to determine which web sites meet the specified functional characteristics criteria.

Figure 2:
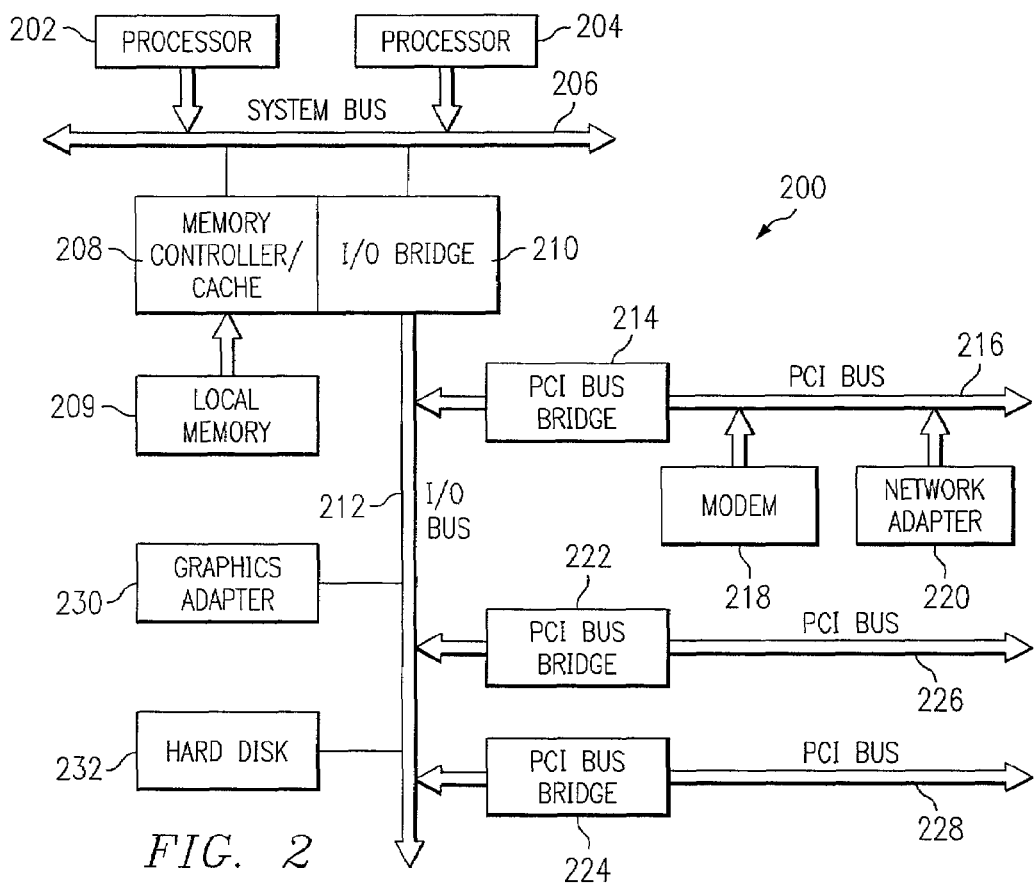
FIG. 2 is an exemplary diagram illustrating a server data processing device in accordance with the present invention.

FIG. 2 is a block diagram depicting a data processing system that may be implemented as a server, such as server 104 in FIG. 1, in accordance with a preferred embodiment of the present invention. This server may be used by the present invention as a mechanism for providing the web site functional characteristic searching service provider.

As shown in FIG. 2, data processing system 200 may be a symmetric multiprocessor (SMP) system including a plurality of processors 202 and 204 connected to system bus 206. Alternatively, a single-processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 provides multiple network connections. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pseries system, a product of International Business Machines Corporation in Armonk, N.Y., running the Advanced Interactive Executive (AIX) operating system or LINUX operating system.

Figure 3:
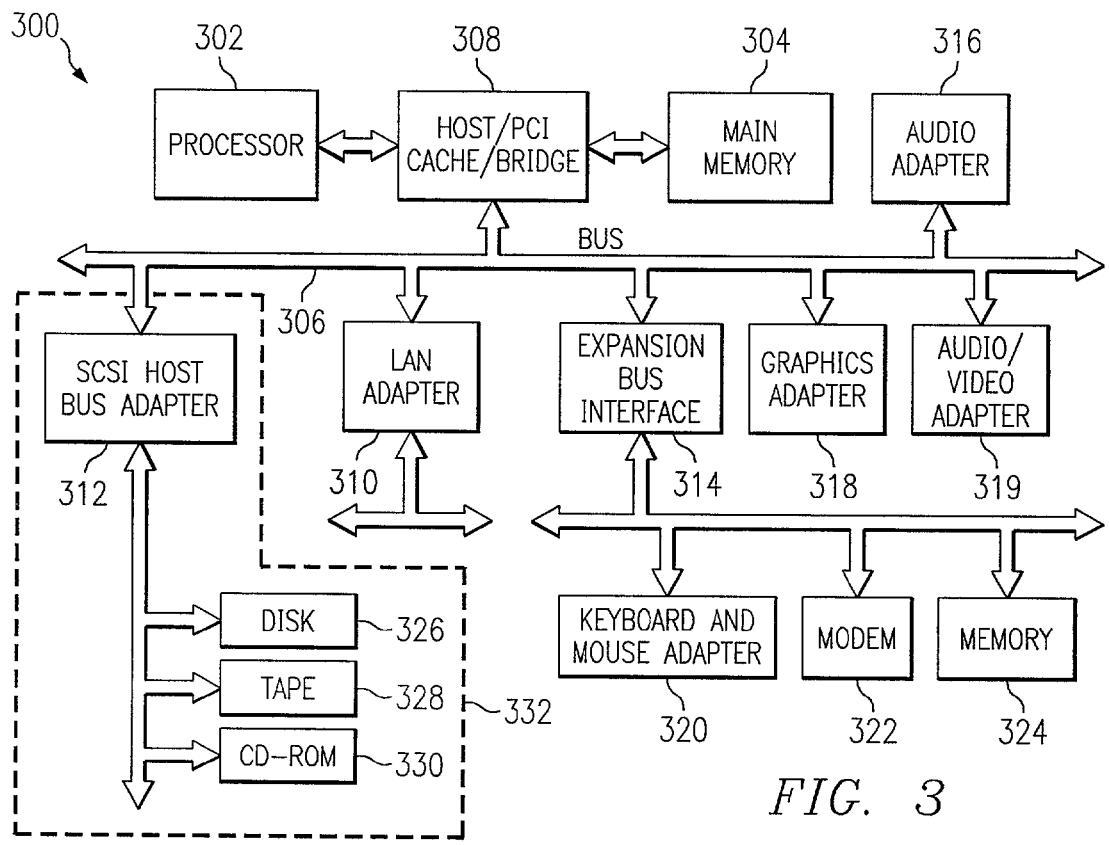
FIG. 3 is an exemplary diagram illustrating a client data processing device in accordance with the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330.

An operating system runs on processor 302 and is used to coordinate and provide control of various components within data processing system 300 in FIG. 3. The operating system may be a commercially available operating system, such as Windows 2000, which is available from Microsoft Corporation. Application programs such as word processors, web browsers, web browser plug ins, email clients and the like may run in conjunction with the operating system and provide calls to the operating system applications executing on data processing system 300. Instructions for the operating system and application programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device configured with non-volatile memory such as ROM and/or flash ROM in which operating system files, application programs and/or user-generated data may be stored. Data processing system 300 also may be a notebook computer, hand held computer, kiosk or a Web appliance. The depicted example in FIG. 3 and above-described examples are not meant to imply architectural limitations.

As noted above, the present invention provides a mechanism through which a user may search for web sites matching specified functional characteristics criteria. Based on the search results of the present invention, the user may determine whether to make use of one or more of the web sites returned in the search results. The particular search results returned are based on the entries in the web site database.

Figure 4:
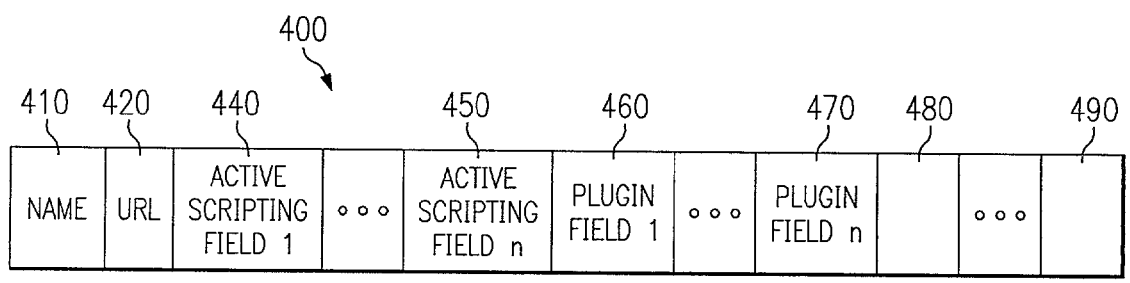
FIG. 4 is an exemplary diagram of a web site database entry according to the present invention.

FIG. 4 is an exemplary diagram of a web site database entry in accordance with the present invention. As shown in FIG. 4, the web site database entry 400 includes a web site name field 410, a web site Uniform Resource Locator (URL) field 420, and at least one of one or more active scripting fields 440-450, one or more plugin fields 460-470, and one or more other functional characteristic fields 480-490. Of course other fields may be included in addition to, or in replacement of, the fields 410-490 depending on the particular implementation without departing from the spirit and scope of the present invention.

The database entries may be generated manually, automatically, or a combination of manually and automatically, depending on the particular embodiment of the present invention. In a manual embodiment of the present invention, a human user may use a web browser application to retrieve web pages of various web sites, in a manner generally known in the art. The human user may then examine the web page to determine its functional characteristics and make note of them in a database entry such as that shown in FIG. 4. Thus, for example, the human user may enter a URL for a web site, examine the returned web page to determine if it uses active scripting, the Shockwave™ plugin, Realplayer™, or the like, and may then put identifiers in a database entry for this web site identifying the functional characteristics of the web site.

Such a manual method of generating the database may include disabling various functions of the web browser and observing the information provided by the web page. This process may be interactively performed with different functions being enabled and disabled until a complete understanding of the functions of the web page is obtained. This understanding of the functions of the web page may then be transcribed into a database entry that may be searched by a web site functional characteristics search engine of the present invention.

In an alternative embodiment, an automated system may be used to retrieve web pages from various URLs and analyze the returned web pages. For example, an automated system may be provided that takes a list of domain names or URLs as input and sends a request for content to each successive domain name or URL on the list. Any returned web pages may then have their markup language (e.g., HyperText Markup Language (HTML), Extensible Markup Language (XML), Wireless Markup Language (WML), etc.) analyzed by the present invention to determine what functionality is provided by, required by and/or absent from the web page. For example, HTML tags may be examined to determine if a particular kind of active scripting is used, whether specific plugin applications are used, and the like.

The information obtained from the analysis of the web page code may then be used to generate a database entry. For example, the URL may be stored in field 420 and the identified active scripting may be stored in fields 440-450. The name of the web page may be identified from a page name tag in the HTML code of the web page and then stored in the field 410. Any plugin module support identified may be stored in the fields 460-470. The resultant database entry may then be stored in the database storage device for optional refinement by a human user and later use by the functional characteristic search engine. Of course a combination of these two approaches may also be used without departing from the spirit and scope of the present invention.

Figure 5:
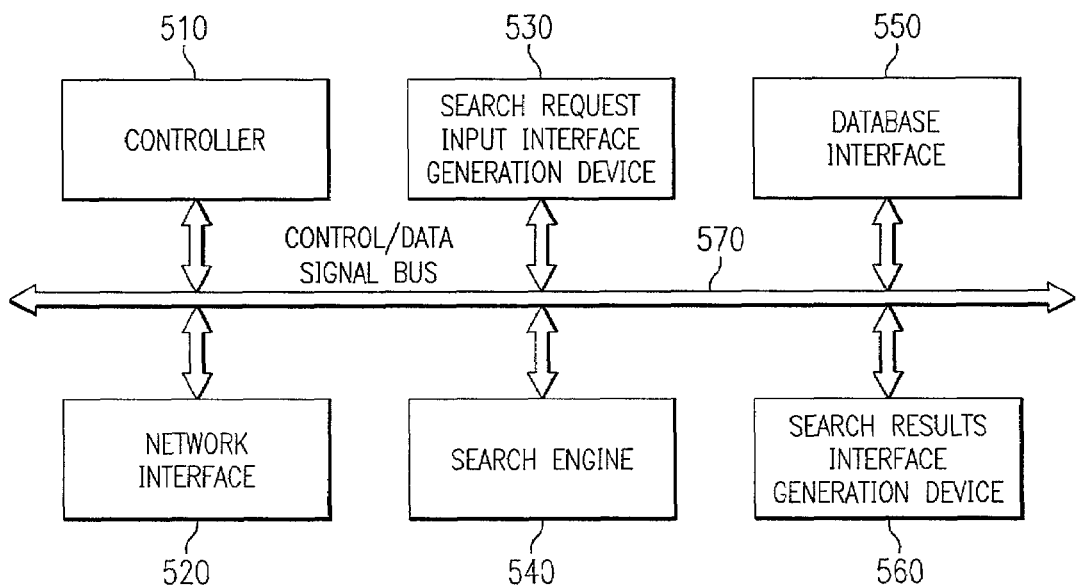
FIG. 5 is an exemplary block diagram of a web site functional characteristic searching service provider according to the present invention.

FIG. 5 is an exemplary block diagram of a web site functional characteristic searching service provider according to the present invention. The elements shown in FIG. 5 may be implemented in software, hardware, or a combination of hardware and software. In a preferred embodiment, the elements in FIG. 5 are implemented as software instructions executed on processing hardware of a server apparatus.

As shown in FIG. 5, the web site functional characteristic searching service provider includes controller software residing in controller 510, a network interface 520, a search request input interface generation device 530, a search engine 540, a database interface 550, and a search results interface generation device 560. The elements 510-560 are coupled to one another by way of control/data signal bus 570. Although a bus architecture is shown in FIG. 5, the present invention is not limited to such and any architecture that facilitates the communication of control/data signals between the elements 510-560 may be used without departing from the spirit and scope of the present invention.

The controller 510 controls the overall operation of the web site functional characteristic searching service provider and orchestrates the operation of the elements 520-560. The controller 510 receives logon requests from client devices via the network interface 520. In response, the controller 510 instructs the search request input interface 530 to provide a search request interface to the client device.

The search request interface is then used by the user of the client device to input and/or select the functional characteristics that are of interest to the user. These may include functional characteristics that the user wishes web sites in the search results to have or not have. The user then transmits back the search request generated using the search request interface to the web site functional characteristic searching service provider. The search request is then provided to the search engine 540.

The search engine 540 parses the search request and performs a search of the web site database based on the search request. The search engine 540 searches the web site database via the database interface 550. The search engine 540 compiles a list of web site database entries that match the criteria specified in the search request and provides this list to the search results interface generation device 560 which generates a search results interface and transmits it to the client device from which the search request was received.

Although not explicitly shown in FIG. 5, as previously described, the present invention may further include a billing system. The billing system may be used to maintain account information for users of the web site functional characteristic searching service provider and provide a mechanism by which payment for use of the present invention may be obtained.

Figure 6:
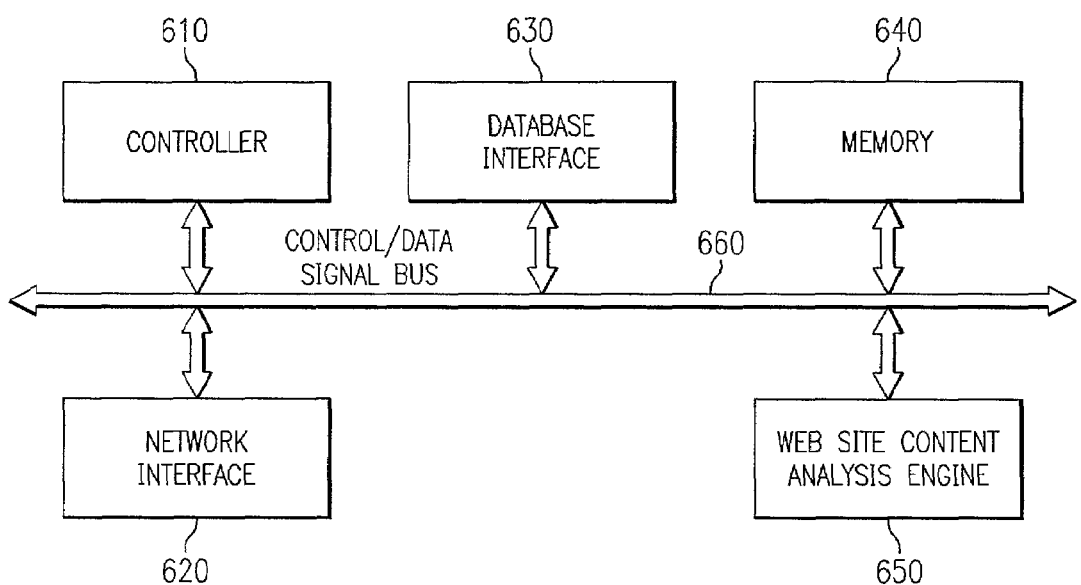
FIG. 6 is an exemplary block diagram of an automated web site database generation device according to the present invention.

FIG. 6 is an exemplary block diagram of a web site database generation device in accordance with the present invention. The elements shown in FIG. 6 may be implemented in software, hardware, or a combination of hardware and software. In a preferred embodiment, the elements in FIG. 6 are implemented as software instructions executed on processing hardware of a server apparatus.

As shown in FIG. 6, the web site database generation device includes a controller 610, a network interface 620, a database interface 630, a memory 640, and a web site content analysis engine 650. The elements 610-650 are coupled to one another via the control/data signal bus 660. Although a bus architecture is shown in FIG. 6, the present invention is not limited to such and any architecture that facilitates the communication of control/data signals between the elements 610-650 may be used without departing from the spirit and scope of the present invention.

The controller 610 controls the overall operation of the web site database generation device. The controller 610 operates based on control programs stored in, for example, memory 640. Based on these control programs, the controller 610 queries web sites by sending out requests for content via the network interface 620. The retrieved content, if any, is then analyzed to determine the functional characteristics of the web site. The web site information and functional characteristic information may then be stored as an entry in the web site database via the database interface 630.

Figure 7:
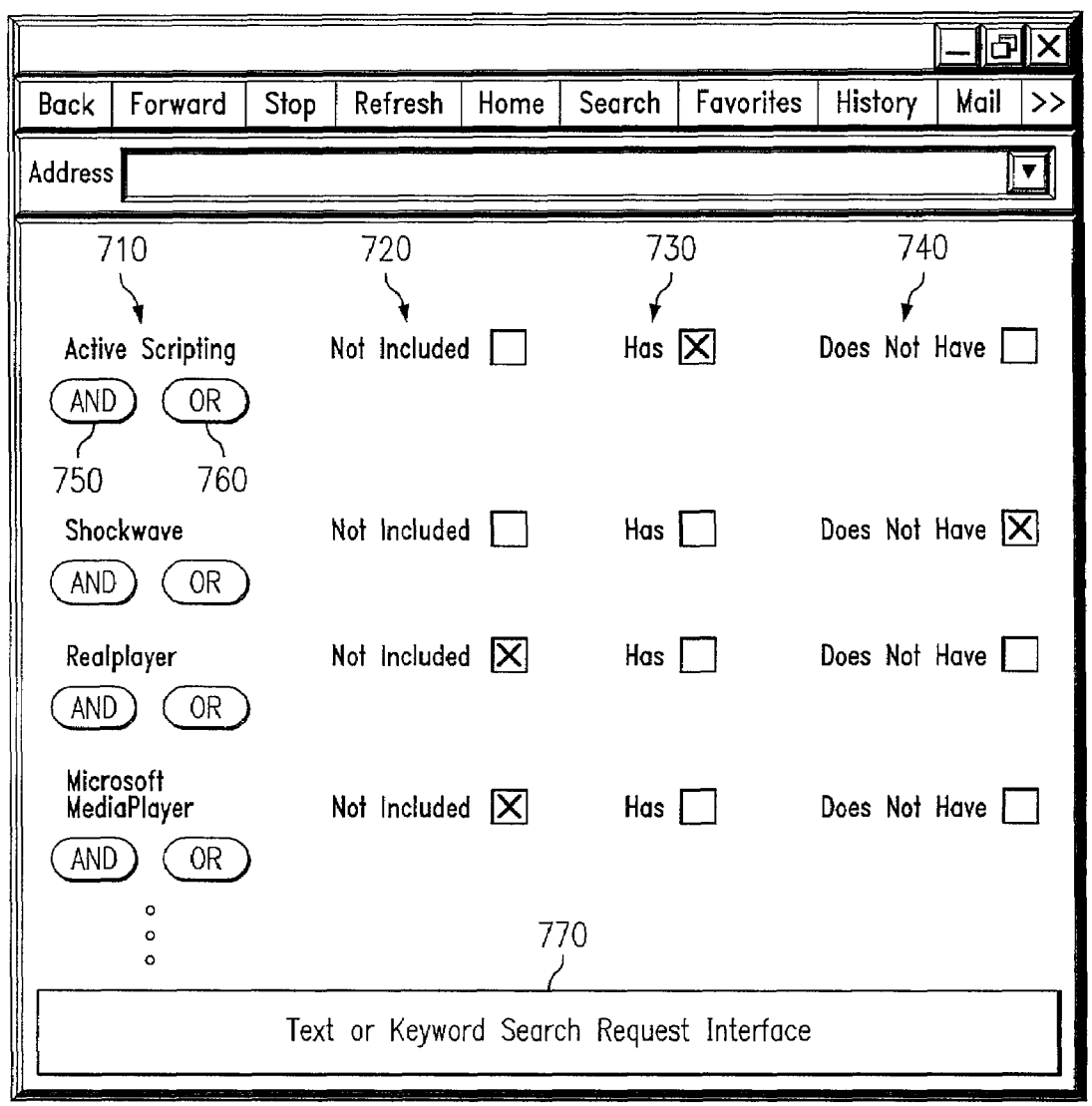
FIG. 7 is an exemplary diagram illustrating a search interface according to the present invention.

FIG. 7 is an exemplary diagram of a search interface according to the present invention. As shown in FIG. 7, the search interface may be implemented as a dynamic web page downloaded to a client device, through which a user may specify a search request regarding functional characteristics criteria of web sites returned by the web site functional characteristic searching service provider of the present invention. Alternatively, the search interface may be implemented as a graphical user interface (GUI) resident on a client device. The particular implementation of the search interface may take various forms and the present invention is not limited to any one type of search interface.

As shown in FIG. 7, the search interface includes a listing of functional characteristics 710 and a plurality of settings for each functional characteristic 720-740. As previously mentioned, the functional characteristics 710 indicate functions supported by the web site and/or functions that are enabled on client web browsers. Such functional characteristics 710 may include, for example, active scripting, various plugin applications, and the like. In addition, the functional characteristics 710 may further include an ability to accept user specified tags to be searched for as either supported or not supported by web sites. In this way the user may define the type of functional characteristic searched for should the functional characteristic not be listed in the search interface.

In addition, functional characteristic grouping settings (Boolean operators) 750-760 are provided for indicating groupings (specifying Boolean operations upon) of functional characteristics. These functional characteristic grouping settings provide a means for linking functional characteristics in much the same way as they are used in text-based searching.

Initially, the setting for each functional characteristic 710 is set to "not included" 720 meaning that the functional characteristic is not a basis upon which a functional characteristic search is to be made. In addition, initially the functional characteristic grouping settings are all set to "AND". The user may, through a user interface, such as a pointing device, keyboard, or the like, associated with the client computer, change the settings 730-760 for search criteria specified by one or more of the functional characteristics 710 and the functional characteristic groupings (Boolean operations).

For example, the user may select to include the functional characteristic of JavaScript active scripting by selecting the "HAVE" setting 730 associated with JavaScript and not include the functional characteristic of supporting the Shockwave™ plugin application by selecting the "DOES NOT HAVE" setting 740 associated with the Shockwave™ plugin application. Alternatively, for example, the user may select to search for web sites that either support JavaScript active scripting or the Shockwave™ plugin application. In order to do this, the user may select the "HAVE" setting 730 associated with JavaScript active scripting, select the "OR" 760 functional characteristic grouping setting (Boolean operator), and select the "HAVE" setting 730 for the Shockwave™ plugin application.

In addition to the functional characteristic search request settings described above, the search interface of the present invention may further include a conventional text search or keyword search request interface portion 770 through which a user may enter search terms or keywords in which the user is interested. The interface portion 770 may be an interface to an existing text or keyword search engine such as Yahoo™, HotBot™, Lycos™, Webcrawler™, or the like, or may be an interface to a text search engine integrated with the present invention.

Once the user has selected all of the functional characteristics, their groupings, and optionally any text search terms, the user may select the "SEARCH" virtual button to submit the search request to the web site functional characteristic searching service provider. The service provider will then parse the search request, perform the search indicated by the search request, and provide search results to the requesting client device using a search results interface.

Figure 8:
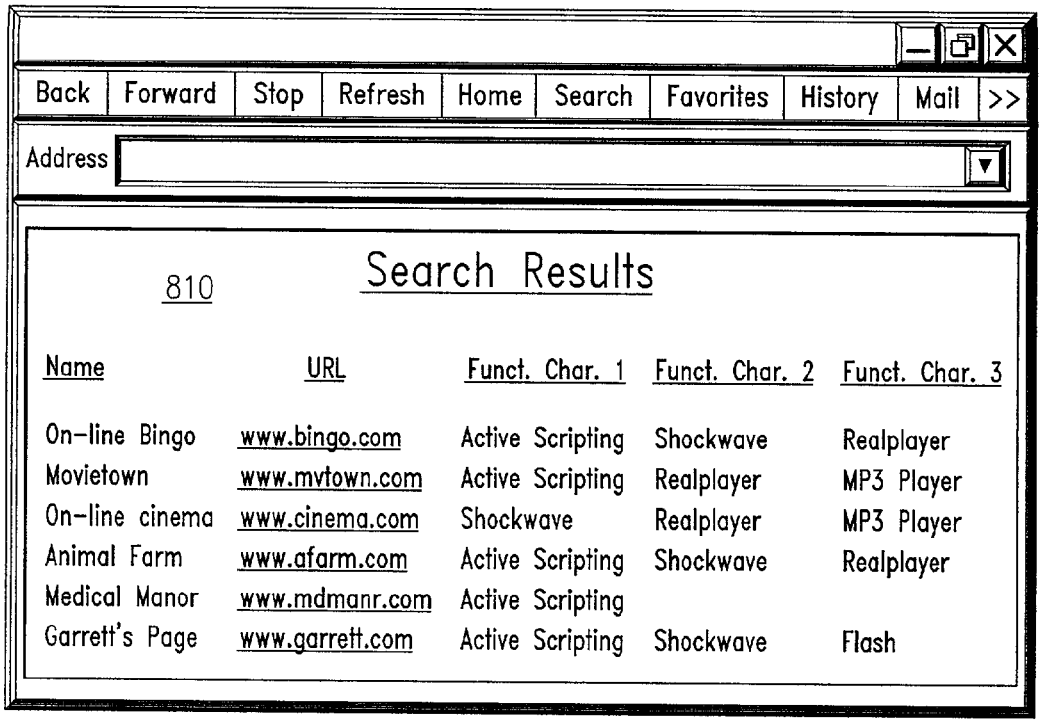
FIG. 8 is an exemplary diagram illustrating a search output interface according to the present invention.

FIG. 8 is an exemplary diagram illustrating a search results interface according to the present invention. As shown in FIG. 8, the search results interface may include a results portion 810 where the results of the search are displayed. The results may include a listing of the web sites identified and their respective functional characteristics. In addition, the web site listing may include a hyperlink to the web site, e.g., the URL for the web site. The user may then select the hyperlink for a web site from the list and be provided with the web site web page. Other standard functions may be provided such as the ability to save the listing of search results, printing the listing of search results, and the like.

Figure 9:
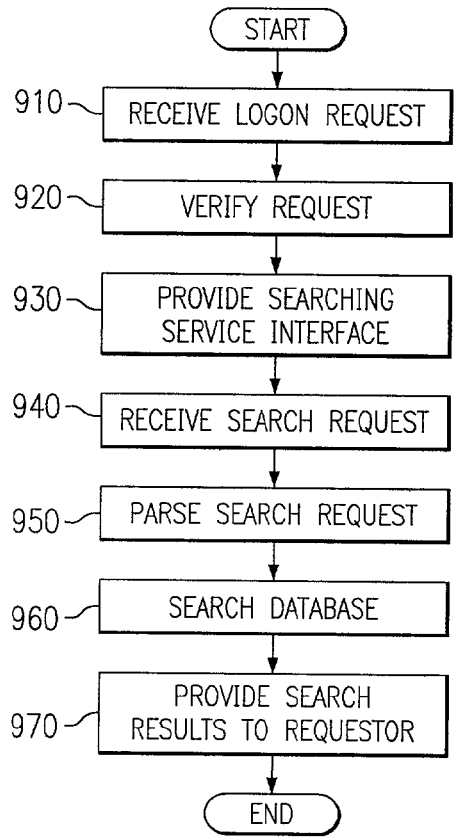
FIG. 9 is a flowchart outlining an exemplary operation of the present invention.

FIG. 9 is a flowchart outlining an exemplary operation of the present invention when performing a web site functional characteristic searching service. As shown in FIG. 9, the operation starts with a logon request from a client device (step 910). The logon request is verified (step 920) and a web site functional characteristic searching service interface is provided to the client device (step 930). The user of the client device uses this interface to enter the functional characteristics to include in the search and returns a search request which is received by the present operation (step 940). The search request is parsed (step 950) and the search is conducted on the entries in the web site functional characteristic database (step 960). The results of the search are compiled and provided to the client device using a search results interface (step 970). Optionally, a billing system may then be used to charge the user of the client device for use of the service. The operation then ends.

Figure 10:
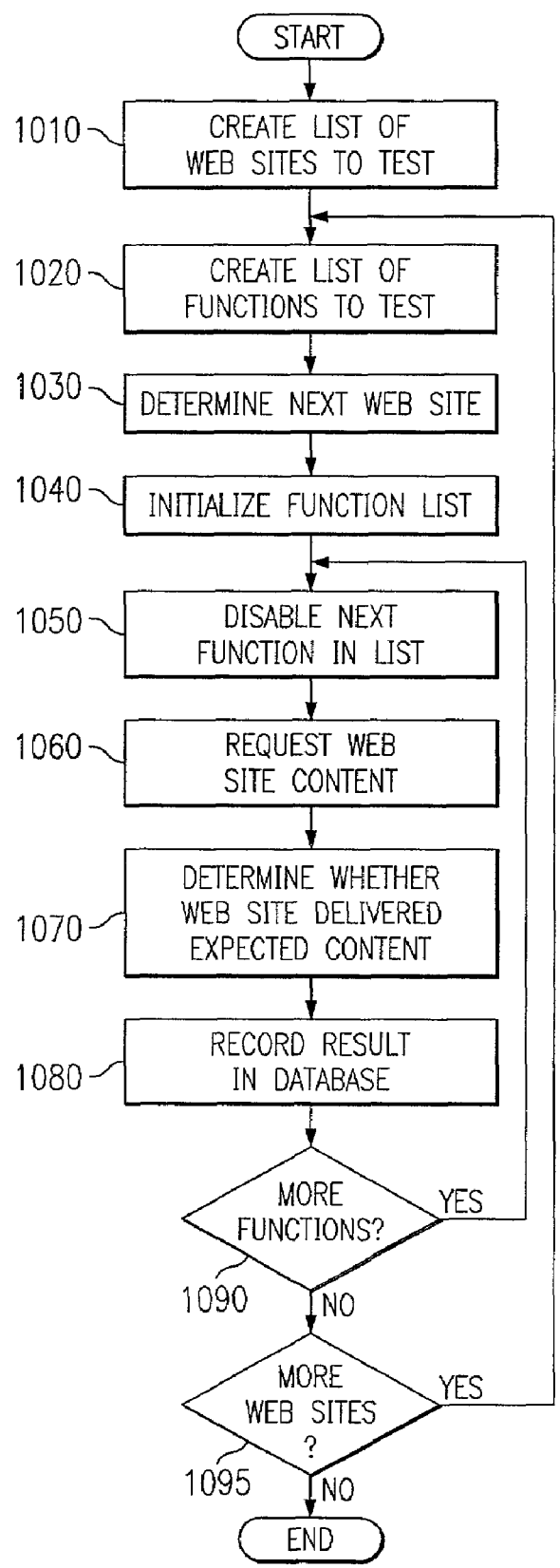
FIG. 10 is a flowchart outlining an exemplary operation of the present invention when generating a web site functional characteristic database.

FIG. 10 is a flowchart depicting a method of obtaining information with which to populate the web site characteristic database. In the FIG. 10 example, all the functional characteristics to be tested are tested for a given web site before testing the next web site, although the sequence of operations could be altered without departing from the intent of the present invention. A list of web sites (domain names) or web pages (URLs) to test for their functional characteristics is created (step 1010) and a list of functional characteristics to test is created (step 1020). The next web site or web page to be tested, from the list generated during step 1010, is determined (step 1030). The list of functions under test generated during step 1020 is initialized (step 1040).

The next function in the list of functions is disabled for testing purposes (step 1050). All other functions are enabled, in order to reveal the effects of just the function under test. Disabling the next function in the list of functions is not a mandatory step and may be optional depending on the particular embodiment chosen. For example, in a fully automatic embodiment, disabling a function may not be necessary since only the code of the received content is analyzed to determine the functional characteristics of the web site.

The client performing the test makes an HTTP request to the specified web site to obtain the specified web page (step 1060) and receives the reply. It is determined whether the web site delivered the expected content (step 1070). Step 1070 could be performed by a human being manually inspecting and analyzing the content in the manual embodiment, or by an automated program analyzing the markup language document in the automated embodiment, or a combination of the two in a hybrid embodiment. As a variant, step 1070 can determine whether the received web page matches the functional characteristic under test for certain functional characteristics where an analysis of markup language or inspection of the HTTP header sent by the web server provides a definitive answer.

The result is recorded in a database (step 1080). A determination is made as to whether more functions from the function list need to be tested (step 1090). If the result of this determining step is yes, then control passes to step 1050. If the result of this determining step is no, then control passes to step 1095.

In step 1095 it is determined whether there are more web sites and/or web pages to test, from the list of web sites and/or web pages. If the result of the step 1095 test is yes, then control passes to step 1020 where a list of functions for testing is again created. In some variant implementations, the same list of functions may be tested for all web sites, in which case the result of the step 1095 determination instead passes control to step 1030. This execution path is omitted from the FIG. 10 illustration for the sake of simplicity.

If the result of the step 1095 test is no, then all web sites and/or web pages have been tested and the operations of FIG. 10 conclude.

Thus, the present invention provides an apparatus and method for determining the compatibility of web sites with functional characteristic requirements specified in a search request. In this way, a user may discern web sites based on their functional abilities to deliver particular kinds of web content using particular kinds of delivery mechanisms supported by the typical clients accessing the web sites, rather than just based on their subject matter.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type type media, such as digital and analog communications links, wired or wireless communications links using transmission forms, such as, for example, radio frequency and light wave transmissions. The computer readable media may take the form of coded formats that are decoded for actual use in a particular data processing system.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method of identifying web sites, comprising:
   identifying at least one functional characteristic of a web site to be tested, the at least one functional characteristic comprising at least one of use of active scripting, a type of active scripting used, a plug-in application used, use of forms, storing of cookies on a client device, providing dynamic web page content, providing dynamic user interfaces, displaying digital movies, and broadcasting audio data;
   retrieving content for the web site;
   testing the content of the web site for a presence of the at least one functional characteristic; and
   storing results of the testing of the content of the web site.

2. The computer implemented method of claim 1, wherein the at least one functional characteristic identifies a functional characteristic of web sites that requires a function to be enabled by a client device in order to output the web site content on the client device.

3. The computer implemented method of claim 1, further comprising:
   disabling, in a web browser, at least one functional characteristic prior to retrieving the content for the web site.

4. The computer implemented method of claim 3, wherein testing the content of the web site for the presence of the at least one functional characteristic comprises determining if a portion of the content is not output to the web browser due to the at least one functional characteristic in the web browser being disabled.

5. The computer implemented method of claim 1, wherein storing the results of the testing comprises generating an entry in a web site functional characteristics database based on the results of the testing.

6. The computer implemented method of claim 1, wherein retrieving content for the web site comprises generating a list of web sites to be tested, and selecting a next web site in the list of web sites to be tested.

7. The computer implemented method of claim 6, wherein identifying at least one functional characteristic to be tested comprises generating a list of functional characteristics to be tested, and selecting a next functional characteristic in the list of functional characteristics to be tested.

8. The computer implemented method of claim 7, wherein testing the content of the web site for the presence of the at least one functional characteristic comprises for each web site in the list of web sites, testing each functional characteristic in the list of functional characteristics.

9. The computer implemented method of claim 5, further comprising:
   receiving a search request including a designation of one or more web site functional characteristics;
   searching the web site functional characteristics database based on the search request; and
   returning results of searching the web site functional characteristics database to thereby identify zero or more web sites having or not having the designated one or more web site functional characteristics.

10. A computer program product comprising:
    a computer usable medium having computer usable program code for identifying web sites, said computer program product including:
    computer usable program code for identifying at least one functional characteristic of a web site to be tested, the at least one functional characteristic comprising at least one of use of active scripting, a type of active scripting used, a plug-in application used, use of forms, storing of cookies on a client device, providing dynamic web page content, providing dynamic user interfaces, displaying digital movies, and broadcasting audio data;
    computer usable program code for retrieving content for the web site;
    computer usable program code for testing the content of the web site for a presence of the at least one functional characteristic; and
    computer usable program code for storing results of the testing of the content of the web site.

11. The computer program product of claim 10, wherein the at least one functional characteristic identifies a functional characteristic of web sites that requires a function to be enabled by a client device in order to output the web site content on the client device.

12. The computer program product of claim 10, further comprising:
    computer usable program code for disabling, in a web browser, at least one functional characteristic prior to retrieving the content for the web site.

13. The computer program product of claim 12, wherein the computer usable program code for testing the content of the web site for the presence of the at least one functional characteristic comprises computer usable program code for determining if a portion of the content is not output to the web browser due to the at least one functional characteristic of the web browser being disabled.

14. The computer program product of claim 10, wherein the computer usable program code for storing the results of the testing comprises computer usable program code for generating an entry in a web site functional characteristics database based on the results of the testing.

15. The computer program product of claim 10, wherein the computer usable program code for retrieving content for the web site comprises computer usable program code for generating a list of web sites to be tested, and computer usable program code for selecting a next web site in the list of web sites to be tested.

16. The computer program product of claim 15, wherein the computer usable program code for identifying at least one functional characteristic to be tested comprises computer usable program code for generating a list of functional characteristics to be tested, and computer usable program code for selecting a next functional characteristic in the list of functional characteristics to be tested.

17. The computer program product of claim 16, wherein the computer usable program code for testing the content of the web site for the presence of the at least one functional characteristic comprises computer usable program code for testing each functional characteristic in the list of functional characteristics for each web site in the list of web sites.

18. The computer program product of claim 14, further comprising:
computer usable program code for receiving a search request including a designation of one or more web site functional characteristics;
computer usable program code for searching the web site functional characteristics database based on the search request; and
computer usable program code for returning results of searching the web site functional characteristics database to thereby identify zero or more web sites having or not having the designated one or more web site functional characteristics.

19. An apparatus for identifying web sites, comprising:
a network interface;
a database interface; and
a web site content analysis engine coupled to the network interface and the database interface, wherein the web site content analysis engine identifies at least one functional characteristic of a web site to be tested, the at least one functional characteristic comprises at least one of use of active scripting, a type of active scripting used, a plug-in application used, use of forms, storing of cookies on a client device, providing dynamic web page content, providing dynamic user interfaces, displaying digital movies, and broadcasting audio data, retrieves content for the web site via the network interface, tests the content of the web site for a presence of the at least one functional characteristic, and stores results of the testing of the content of the web site via the database interface.

20. The apparatus of claim 19, wherein the at least one functional characteristic identifies a functional characteristic of web sites that requires a function to be enabled by a client device in order to output the web site content on the client device.

21. The apparatus of claim 19, wherein the web site content analysis engine disables, in a web browser, at least one functional characteristic prior to retrieving the content for the web site.

22. The apparatus of claim 21, wherein the web site content analysis engine tests the content of the web site for the presence of the at least one functional characteristic by determining if a portion of the content is not output to the web browser due to the at least one functional characteristic of the web browser being disabled.

23. The apparatus of claim 19, wherein the web site content analysis engine stores the results of the testing by generating an entry in a web site functional characteristics database based on the results of the testing.

24. The apparatus of claim 19, wherein the web site content analysis engine retrieves content for the web site by generating a list of web sites to be tested, and selecting a next web site in the list of web sites to be tested.

25. The apparatus of claim 24, wherein the web site content analysis engine identifies at least one functional characteristic to be tested by generating a list of functional characteristics to be tested, and selecting a next functional characteristic in the list of functional characteristics to be tested.

26. The apparatus of claim 25, wherein the web site content analysis engine tests the content of the web site for the presence of the at least one functional characteristic by, for each web site in the list of web site, testing each functional characteristic in the list of functional characteristics.

27. The apparatus of claim 23, further comprising:
a search engine coupled to a search request input interface generation device and a search results interface generation device, wherein the search engine receives a search request including a designation of one or more web site functional characteristics, searches the web site functional characteristics database based on the search request, and returns results of searching the web site functional characteristics database to thereby identify zero or more web sites having or not having the designated one or more web site functional characteristics.

28. A computer implemented method of identifying web sites, comprising:
receiving a search request including a designation of one or more web site functional characteristics, wherein the one or more web site functional characteristics comprise at least one of use of active scripting, a type of active scripting used, a plug-in application used, use of forms, storing of cookies on a client device, providing dynamic web page content, providing dynamic user interfaces, displaying digital movies, and broadcasting audio data;
searching a web site functional characteristics database based on the search request; and
returning results of searching the web site functional characteristics database to thereby identify zero or more web sites having or not having the designated one or more web site functional characteristics.

29. The computer implemented method of claim 28, wherein the one or more web site functional characteristics identify functions that are enabled on a client device web browser in order to output the web site content on the client device.

30. The computer implemented method of claim 28, further comprising:
charging a fee to an account of a source of the search request for searching the web site functional characteristics database based on the search request.

31. A data structure having entries corresponding to web sites for use by a computing device to identify web sites based on functional characteristics, each entry comprising:
a web site identifier field for identifying a web site; and
one or more functional characteristic fields for identifying one or more functional characteristics of the web site identified in the web site identifier field, wherein the one or more functional characteristics comprise at least one of use of active scripting, a type of active scripting used, a plug-in application used, use of forms, storing of cookies on a client device, providing dynamic web page content, providing dynamic user interfaces, displaying digital movies, and broadcasting audio data.

32. The data structure of claim 31, wherein the functional characteristics identify functions that are enabled on a client device web browser in order to output the web site content on the client device.

33. The data structure of claim 31, wherein the data structure is stored on a computer usable medium.

34. The data structure of claim 33, wherein the computer usable medium is part of a network attached storage unit.

35. The computer implemented method of claim 1, wherein the results of the testing of the content of the web site are stored in a network attached storage unit.

36. The computer program product of claim 10, wherein the computer usable program code for storing the results of the testing of the content of the web site comprises computer usable program code for storing the results of the testing in a network attached storage unit.

37. The apparatus of claim 19, wherein the web site content analysis engine stores the results of the testing of the web site in a database stored on a network attached storage unit.

38. The computer implemented method of claim 1, wherein the at least one functional characteristic comprises use of active scripting.

39. The computer program product of claim 10, wherein the at least one functional characteristic comprises use of active scripting.

40. The apparatus of claim 19, wherein the at least one functional characteristic comprises use of active scripting.

41. The computer implemented method of claim 28, wherein the one web site functional characteristic comprises use of active scripting.

42. The data structure of claim 31, wherein the one functional characteristic comprises use of active scripting.

* * * * *